(12) United States Patent
Huang et al.

(10) Patent No.: US 8,432,071 B2
(45) Date of Patent: Apr. 30, 2013

(54) METHOD AND APPARATUS FOR ENERGY HARVEST FROM AMBIENT SOURCES

(75) Inventors: Ming-Chieh Huang, San Jose, CA (US);
Chan-Hong Chern, Palo Alto, CA (US);
David Barry Scott, Plano, TX (US)

(73) Assignee: Taiwan Semiconductor Manufacturing Company, Ltd. (TW)

( * ) Notice: Subject to any disclaimer, the term of this patent is extended or adjusted under 35 U.S.C. 154(b) by 341 days.

(21) Appl. No.: 12/851,023

(22) Filed: Aug. 5, 2010

(65) Prior Publication Data

US 2012/0032518 A1 Feb. 9, 2012

(51) Int. Cl.
*G05F 3/06* (2006.01)
(52) U.S. Cl.
USPC .......................................................... 307/151
(58) Field of Classification Search ................... 307/151
See application file for complete search history.

(56) References Cited

U.S. PATENT DOCUMENTS

2011/0062912 A1* 3/2011 Yang et al. .................... 320/101

* cited by examiner

*Primary Examiner* — Robert L. Deberadinis
(74) *Attorney, Agent, or Firm* — Lowe Hauptman Ham & Berner, LLP

(57) ABSTRACT

An energy harvesting system includes a plurality of transducers. The transducers are configured to generate direct current (DC) voltages from a plurality of ambient energy sources. A sensor control circuit has a plurality of sensors configured to detect the DC signals from the plurality of transducers. A DC-to-DC converter is configured to supply an output voltage. A plurality of switches, each switch coupled between the DC-to-DC converter and a corresponding transducer of the plurality of transducers. The sensor control circuit enables one switch of the plurality of switches and disables the other switches of the plurality of switches based on a priority criterion.

18 Claims, 4 Drawing Sheets

METHOD AND APPARATUS FOR ENERGY HARVEST FROM AMBIENT SOURCES

TECHNICAL FIELD

The present disclosure relates generally to an energy harvesting system.

BACKGROUND

An energy harvesting system converts and transfers energy from the environment and/or collects and stores the energy in the form of, for example, electrical energy. However, with different energy sources, there could be different availability and also different output voltage, current, and/or power from each source. Therefore, new methods, apparatus, and circuits for an energy harvesting system are desired to solve the above issue.

BRIEF DESCRIPTION OF THE DRAWINGS

Reference is now made to the following descriptions taken in conjunction with the accompanying drawings, in which.

DETAILED DESCRIPTION

The making and using of various embodiments are discussed in detail below. It should be appreciated, however, that the present disclosure provides many applicable inventive concepts that can be embodied in a wide variety of specific contexts. The specific embodiments discussed are merely illustrative of specific ways to make and use, and do not limit the scope of the disclosure.

Figure 1:
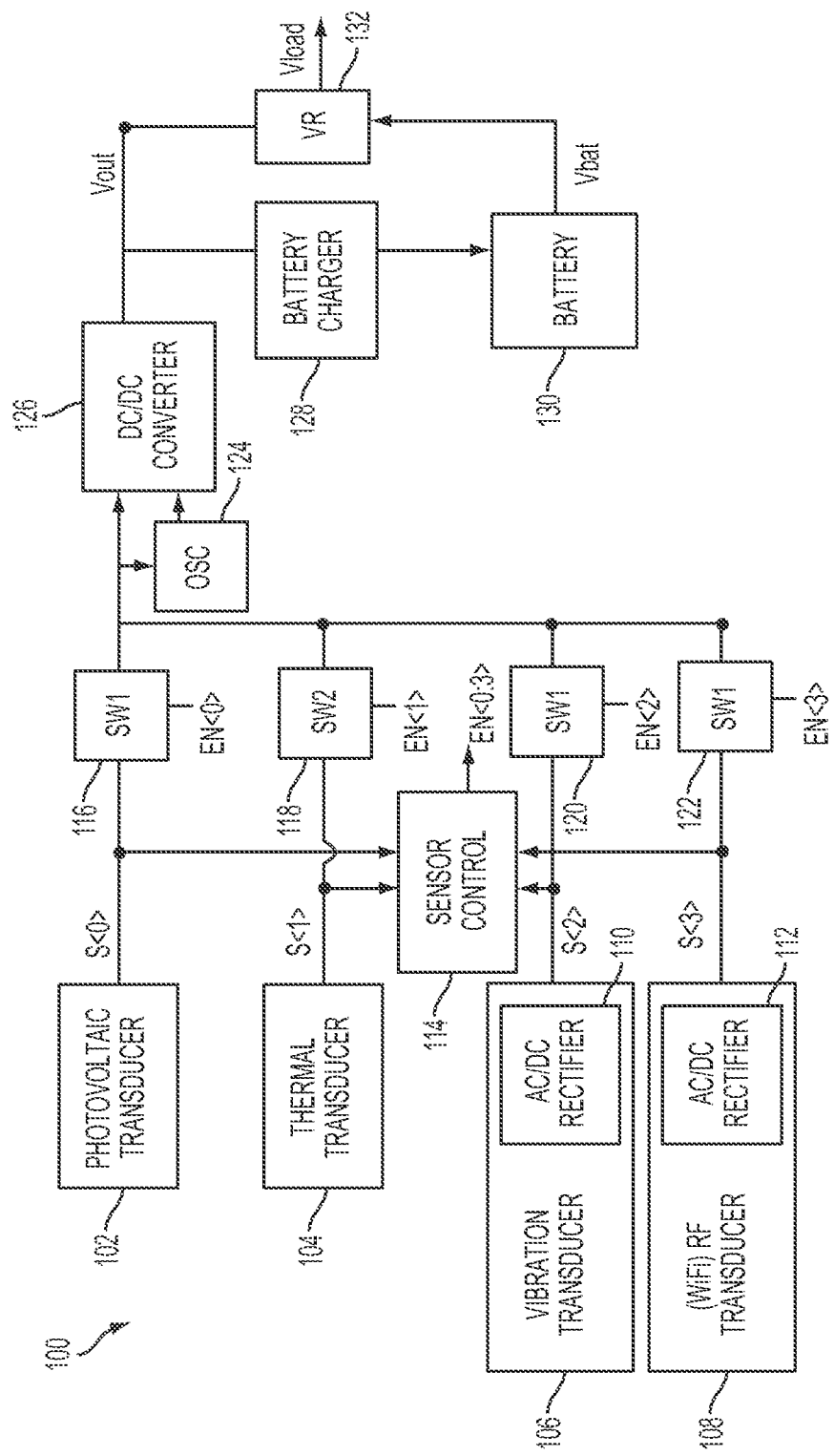
FIG. 1 is a schematic diagram showing an exemplary energy harvesting system according to one embodiment.

FIG. 1 is a schematic diagram showing an exemplary energy harvesting system according to one embodiment. An energy harvesting system 100 includes transducers 102, 104, 106, and 108. Each transducer generates electrical energy from one or more ambient (environmental) sources, e.g., the transducer 102 from a photovoltaic source (solar power), the transducer 104 from a thermal source, the transducer 106 from a vibration source, and the transducer 108 from a WiFi radio frequency (RF) signal source. The transducer 108 can convert any RF signal energy in general and is not limited to WiFi RF signal energy, which is one of the stronger RF energy if the transducer 108 is close to a hotspot for a WiFi RF signal.

The transducers 102, 104, 106, and 108 are configured to generate direct current (DC) signals, e.g., S<0>, S<1>, S<2>, and S<3>. The transducers 106 and 108 have alternating current (AC)-to-DC rectifiers 110 and 112 to convert the initial AC signals generated from vibration and RF signal to DC signals. In at least one embodiment, the transducers 102, 104, 106, and 108 can generate different electrical power values. For example, the photovoltaic transducer 102 can generate about 10 mW/cm$^2$. The thermal transducer 104 can generate about 30 μW/cm$^2$. The vibration transducer 106 can generate about 30 μW/cm$^2$. A WiFi RF transducer 108 can generate about 10 μW/cm$^2$. In some embodiments, the AC-to-DC rectifiers 110 and 112 may be a half wave rectifier, a Dickson charge pump, or any other suitable circuits.

A sensor control circuit 114 includes sensors configured to detect the DC signals, e.g., S<0>, S<1>, S<2>, and S<3>, from the transducers 102, 104, 106, and 108. Such sensors, e.g., a voltage sensor and/or a current sensor, may be any suitable sensors. In some embodiments, there is only one sensor for detecting the DC signals from transducers 102, 104, 106, and 108. From the detected DC signals, the sensor control circuit 114 determines which transducer generates a DC signal above a threshold value, e.g., a current, a voltage, or a power value, etc., and/or which transducer can be coupled to a DC-to-DC converter 126, based on priority criteria. In some embodiments, a comparator performs the determination of whether a transducer generates a DC signal above a threshold value.

In at least one embodiment, the priority criteria can be predetermined, e.g., a first priority given to the photovoltaic transducer 102, a second priority given to the thermal transducer 104, a third priority given to the vibration transducer 106, and a fourth priority given to the RF transducer 108. In some other embodiments, the transducers may be given priorities different from the ones in the example disclosed above. Whenever a higher priority DC signal is available, the higher priority DC signal is selected. This predetermined priority can depend on the characteristics of each energy source, e.g., average (expected) power level, efficiency, duration, etc. In another embodiment, the priority criteria can be based on the comparison between the detected DC signals, e.g., the highest voltage, current, or power generating transducer can be selected.

The sensor control circuit 114 generates a control signal, e.g., EN<0:3> including EN<0>, EN<1>, EN<2>, and EN<3>, which enables one of the switches 116, 118, 120, and 122, and disables the other switches, to couple one selected transducer to the DC-to-DC converter 126. The DC-to-DC converter 126 is configured to receive the DC signal from the selected transducer and to supply an output voltage Vout having a desired voltage level. In some embodiments, the DC-to-DC converter 126 may be a boost converter, a charge pump, or any other suitable circuits. In some embodiments, a boost converter can provide a relatively precise conversion factor (voltage output to voltage input ratio). A charge pump may provide relatively higher efficiency but a less flexible conversion factor. Depending on implementations, the DC-to-DC converter 126 may handle different levels of DC signals from different transducers, e.g., 102, 104, 110, and 112.

In some embodiments, an oscillator 124 is coupled to the DC-to-DC converter 126 to provide a clock signal. A voltage-controlled oscillator (VCO) can be used to adapt to selected DC signal's voltage level and provide a desired output voltage Vout. A voltage regulator (VR) 132 is coupled to Vout and supplies a voltage Vload for the next stage. A battery charger 128 is also coupled to Vout and charges a battery 130. In some embodiments, when Vout is above a certain threshold value, the voltage regulator 132 can use Vout to generate the desired Vload. When Vout is below the threshold value, a voltage Vbat from the battery 130 can be supplied to the voltage regulator 132 to generate Vload.

Figure 2:
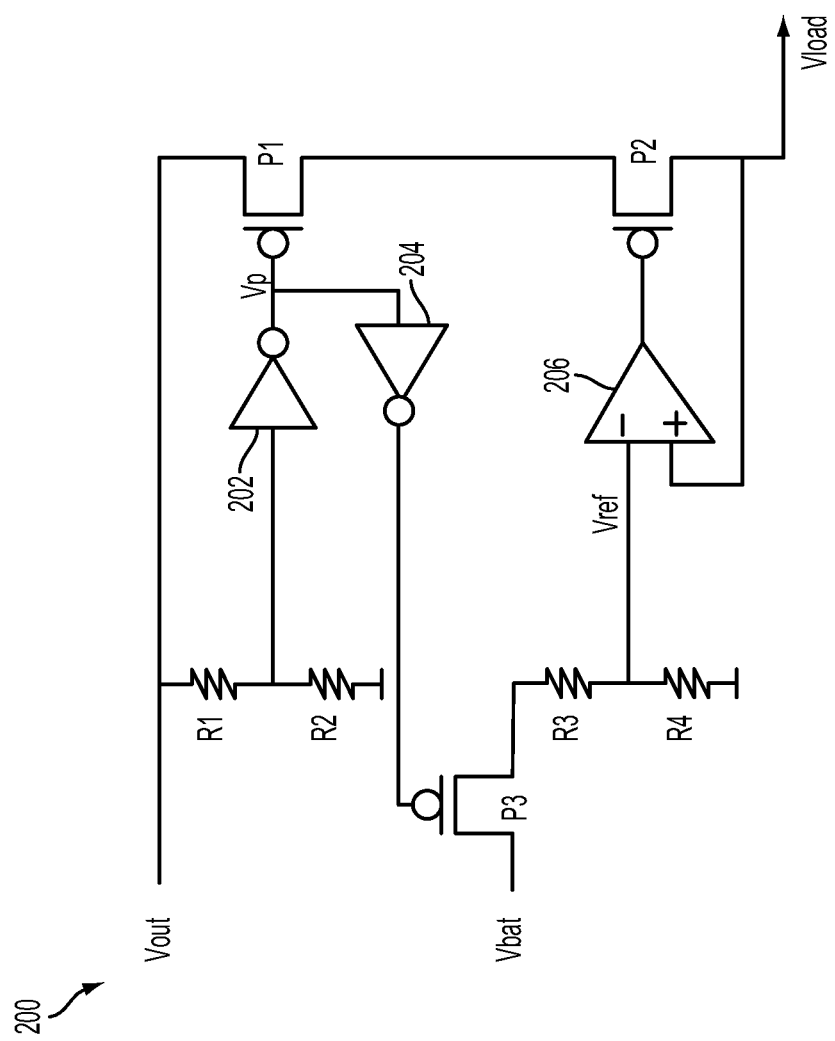
FIG. 2 is a schematic diagram showing an exemplary voltage regulator for the energy harvesting system of FIG. 1 according to one embodiment.

FIG. 2 is a schematic diagram showing an exemplary voltage regulator for the energy harvesting system of FIG. 1 according to one embodiment. The voltage regulator circuit 200 can be coupled to Vout or Vbat to generate Vload, depending on the voltage level of Vout. When Vout is sufficiently high, the voltage input to an inverter 202 had a logical 1 from a voltage divider using resistor R1 and R2. The inverted signal from the inverter 202 is a logical 0 to enable (turn on) the PMOS transistor P1. The inverter 204 outputs a logical 1 to disable (turn off) a PMOS transistor P3.

An operational amplifier (Op Amp) 206 keeps Vref and Vload approximately at the same level and has a logical 0 output to keep a PMOS transistor P2 turned on. Therefore, when Vout is high enough to turn on the PMOS transistor P1, Vout is coupled to Vload. Otherwise, the PMOS transistor P3 is turned on instead of the PMOS transistor P1 to couple Vbat from the battery 130 (shown in FIG. 1) to Vload. A voltage divider (using resistors R3 and R4) determines a voltage Vref to the Op Amp 206. The OP Amp 206 keeps Vload approximately equal to Vref.

Figure 3:
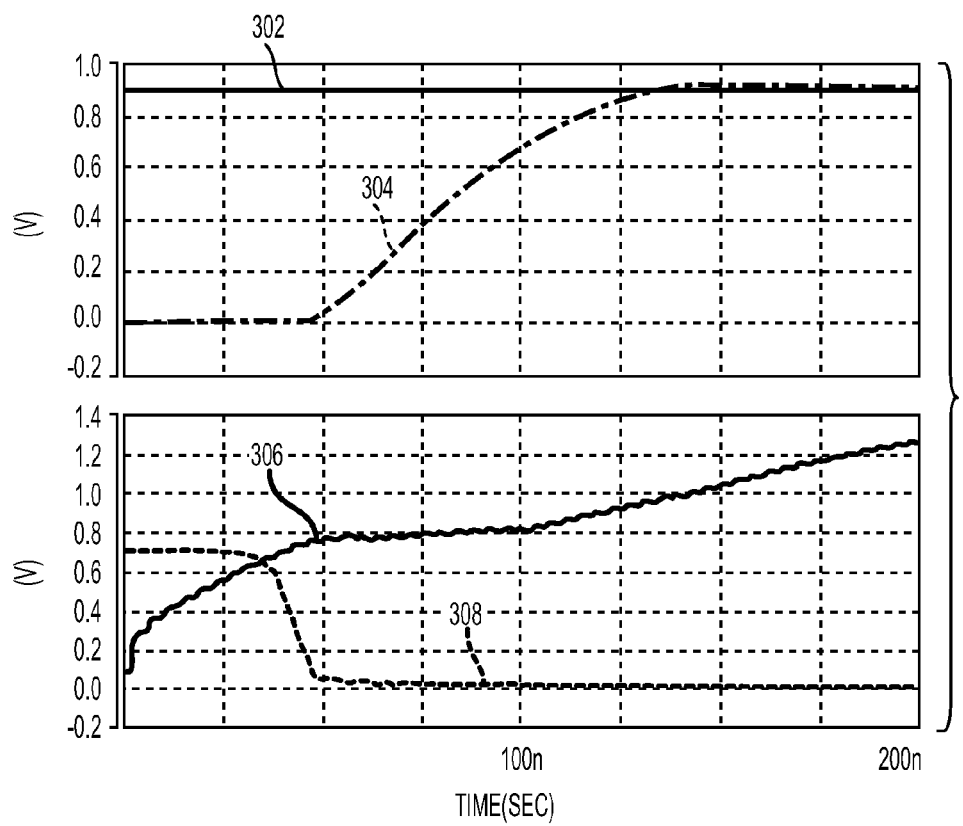
FIG. 3 is a plot showing waveforms of an exemplary voltage regulator of FIG. 2 without the battery according to one embodiment.

FIG. 3 is a plot showing waveforms of an exemplary voltage regulator of FIG. 2 without the battery according to one embodiment. FIG. 3 assumes that Vref is a constant voltage kept at a desired value of Vload. There is no battery that supplies Vbat in this embodiment. In FIG. 3, as Vout 306 from the DC-to-DC converter 126 (shown in FIG. 1) increases, Vp 308 (the gate voltage of the PMOS transistor P1) decreases to a logical 0 and Vload 304 increases to reach Vref 302. If the battery 130 is used, Vload 304 can be kept at Vref 302 by supplying Vbat from the battery 130 to supply Vload 304 at the level of Vref 302 when Vout 306 is low.

Figure 4:
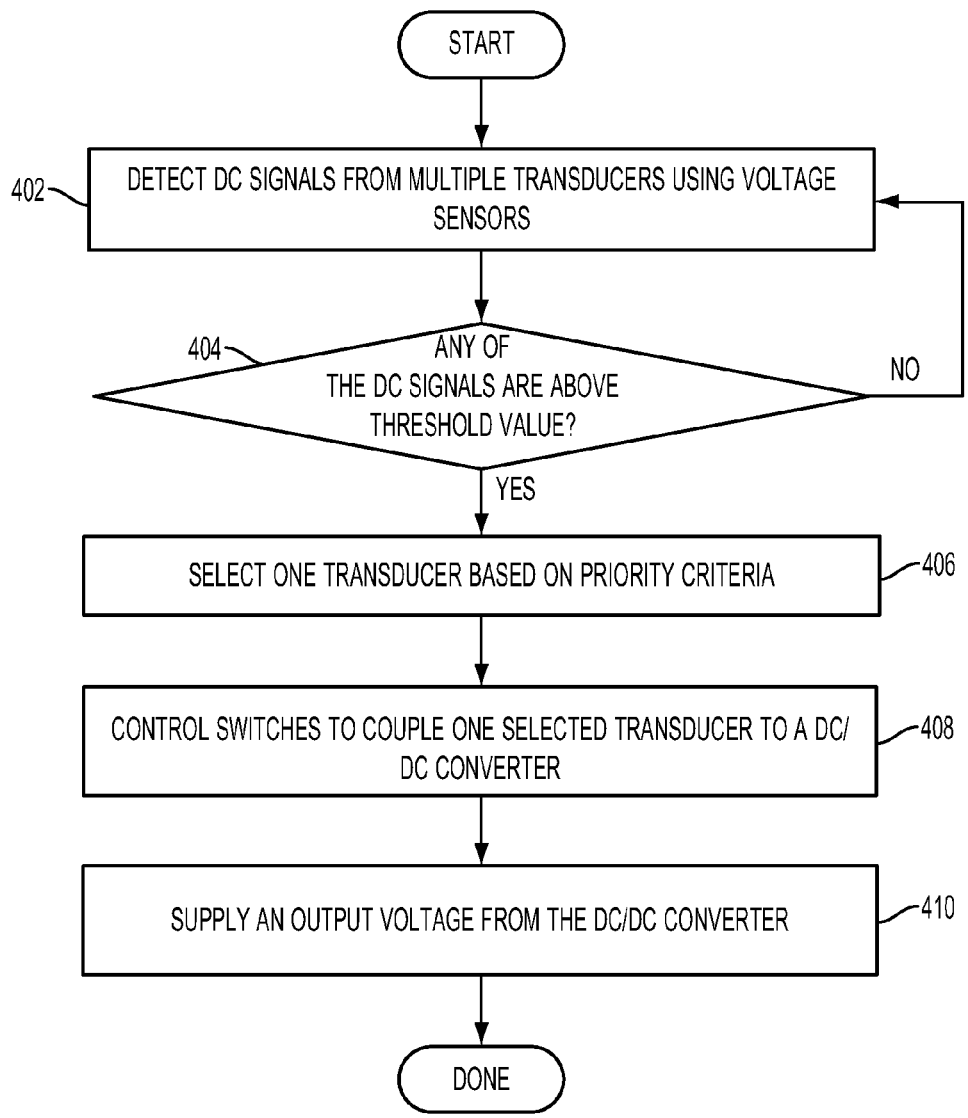
FIG. 4 is a flowchart for a method of energy harvesting according to one embodiment.

FIG. 4 is a flowchart for a method of energy harvesting according to one embodiment. At step 402, DC signals, e.g., S<0>, S<1>, S<2>, and S<3>, are detected from transducers, e.g., 102, 104, 106, and 108, using voltage sensors. The transducers 102, 104, 106, and 108, are configured to generate the DC signals, e.g., S<0>, S<1>, S<2>, and S<3>, from ambient energy sources, e.g., photovoltaic, thermal, vibration, and/or WiFi RF sources, etc.

At step 404, it is determined whether any of the DC signals are above a threshold value, e.g., a voltage, a current, or a power value, and if so, the process goes to step 406 (but if there is no DC signal above the threshold value, it goes back to step 402). At step 406, one transducer is selected from the transducers, e.g., 102, 104, 106, and 108, based on priority criteria. At step 408, switches, e.g., 116, 118, 120, and 122, are controlled to couple one selected transducer to a DC-to-DC converter, e.g., 126. At step 410, an output voltage, e.g., Vout, is supplied from the DC-to-DC converter, e.g., 126.

The priority criteria are predetermined in some embodiments, or can be based on comparisons of the DC signals e.g., S<0>, S<1>, S<2>, and S<3>, from the transducers, e.g., 102, 104, 106, and 108. In some embodiments, the selection among the transducers can be determined based on only one priority criteria. The method can further include coupling the output voltage, Vout, to a voltage regulator, e.g., 132. The method can further include coupling the output voltage, e.g., Vout to a battery charger, e.g., 128, that is arranged to charge a battery, e.g., 130. The method can further include supplying a regulated voltage, Vload, from the voltage regulator, e.g., 132, using the output voltage, e.g., Vout, when the output voltage is above a threshold value. The method can further include supplying a regulated voltage, e.g., Vload, from a voltage regulator, e.g., 132, using a battery voltage, e.g., Vbat, when the output voltage, e.g., Vout, is below a threshold value.

According to some embodiments, an energy harvesting system includes a plurality of transducers. The transducers are configured to generate direct current (DC) voltages from a plurality of ambient energy sources. A sensor control circuit has a plurality of sensors configured to detect the DC signals from the plurality of transducers. A DC-to-DC converter is configured to supply an output voltage. A plurality of switches, each switch coupled between the DC-to-DC converter and each transducer of the plurality of transducers. The sensor control circuit enables one switch of the plurality of switches and disables the other switches of the plurality of switches based on a priority criterion.

According to some embodiments, a method includes detecting direct current (DC) voltages from a plurality of transducers using voltage sensors, the transducers configured to generate the DC signals from a plurality of ambient energy sources. One transducer is selected from the plurality of transducers based on priority criteria. Switches are controlled to couple the selected transducer to a DC-to-DC converter. An output voltage is supplied from the DC-to-DC converter.

A skilled person in the art will appreciate that there can be many embodiment variations of this disclosure. Although the embodiments and their features have been described in detail, it should be understood that various changes, substitutions and alterations can be made herein without departing from the spirit and scope of the embodiments. Moreover, the scope of the present application is not intended to be limited to the particular embodiments of the process, machine, manufacture, and composition of matter, means, methods and steps described in the specification. As one of ordinary skill in the art will readily appreciate from the disclosed embodiments, processes, machines, manufacture, compositions of matter, means, methods, or steps, presently existing or later to be developed, that perform substantially the same function or achieve substantially the same result as the corresponding embodiments described herein may be utilized according to the present disclosure.

The above method embodiment shows exemplary steps, but they are not necessarily required to be performed in the order shown. Steps may be added, replaced, changed order, and/or eliminated as appropriate, in accordance with the spirit and scope of embodiment of the disclosure. Embodiments that combine different claims and/or different embodiments are within scope of the disclosure and will be apparent to those skilled in the art after reviewing this disclosure.

What is claimed is:

1. An energy harvesting system, comprising:
   a plurality of transducers, the transducers configured to generate direct current (DC) signals from a plurality of ambient energy sources, and at least one transducer of the plurality of transducers including an alternating current (AC) to DC rectifier;
   a sensor control circuit having a plurality of sensors configured to detect the DC signals from the plurality of transducers;
   a DC-to-DC converter configured to supply an output voltage; and
   a plurality of switches, each switch coupled between the DC-to-DC converter and a corresponding transducer of the plurality of transducers,
   wherein the sensor control circuit is configured to enable one switch and to disable the other switches of the plurality of switches based on a priority criterion.

2. The system of claim 1, wherein the priority criterion is predetermined.

3. The system of claim 1, wherein the sensor control circuit further comprises a comparator to determine whether any of the DC signals are above a threshold value.

4. The system of claim 1, wherein the sensor control circuit further comprises a comparator to determine which DC signal has the highest power among the DC signals.

5. The system of claim 1, further comprising a voltage regulator coupled to the output voltage, wherein the voltage regulator is configured to supply a regulated voltage using the output voltage when the output voltage is above a threshold value.

6. The system of claim 1, further comprising a battery charger coupled to the output voltage and a battery, wherein the battery is configured to be charged by the battery charger and to supply a battery voltage when the output voltage is below a threshold value.

7. A method comprising:
   detecting direct current (DC) signals from a plurality of transducers using voltage sensors, the transducers configured to generate the DC signals from a plurality of ambient energy sources, and at least one transducer of the plurality of transducers generating a corresponding one of the DC signals by operating an alternating current (AC) to DC rectifier within the at least one transducer;
   selecting one transducer from the plurality of transducers based on a priority criterion;
   controlling switches to couple the selected transducer to a DC-to-DC converter; and
   supplying an output voltage from the DC-to-DC converter.

8. The method of claim 7, further comprising determining whether any of the DC signals are above a threshold value.

9. The method of claim 7, wherein the priority criterion is predetermined.

10. The method of claim 7, wherein the priority criterion is based on comparisons of the DC signals from the plurality of transducers.

11. The method of claim 7, further comprising coupling the output voltage to a voltage regulator.

12. The method of claim 7, further comprising coupling the output voltage to a battery charger that is arranged to charge a battery.

13. The method of claim 7, further comprising supplying a regulated voltage from a voltage regulator using the output voltage when the output voltage is above a threshold value.

14. The method of claim 7, further comprising supplying a regulated voltage from a voltage regulator using a battery voltage when the output voltage is below a threshold value.

15. An energy harvesting system, comprising:
   a plurality of transducers, the transducers configured to generate direct current (DC) signals from a plurality of ambient energy sources, and at least one transducer of the plurality of transducers including an alternating current (AC) to DC rectifier;
   a sensor control circuit having a plurality of sensors configured to detect the DC signals from the plurality of transducers;
   a DC-to-DC converter configured to supply an output voltage;
   a plurality of switches, each switch coupled between the DC-to-DC converter and a corresponding transducer of the plurality of transducers;
   a battery charger coupled to the output voltage and a battery, wherein the battery is configured to be charged by the battery charger; and
   a voltage regulator coupled to the output voltage;
   wherein the sensor control circuit is configured to enables one switch and to disable the other switches of the plurality of switches based on a priority criterion, and the voltage regulator is configured to supply a regulated voltage using the output voltage when the output voltage is above a first threshold value and using a battery voltage from the battery when the output voltage is below the first threshold value.

16. The system of claim 15, wherein the priority criterion is predetermined.

17. The system of claim 15, wherein the sensor control circuit further comprises a comparator to determine whether any of the DC signals are above a second threshold value.

18. The system of claim 15, wherein the sensor control circuit further comprises a comparator to determine which DC signal has the highest power among the DC signals.

* * * * *